INVENTOR.
LEONARD KEDSON

ACTION OF
IMPULSE NOISE MINIMIZER
(Voltage Vs. Time)

INVENTOR.
LEONARD KEDSON

INVENTOR.
LEONARD KEDSON

INVENTOR.
LEONARD KEDSON

CORRECTIVE ACTION ON FILL-IN CORRUPTED SIGNALS
(Voltage Vs. Time)

CORRECTIVE ACTION ON DROP-OUT CORRUPTED SIGNALS
(Voltage Vs. Time)

INVENTOR.
LEONARD KEDSON

Sept. 12, 1967 L. KEDSON 3,341,779

DEMODULATOR FOR REFERENCE POTENTIAL CROSSING DATA-MODULATED SIGNALS

Filed July 10, 1963 7 Sheets-Sheet 6

INVENTOR.
LEONARD KEDSON

CLOCK SLICER WAVE FORMS
(Voltage Vs. Time)

DATA SLICER AND DATA OUTPUT WAVE FORMS
(Voltage Vs. Time)

INVENTOR
LEONARD KEDSON

United States Patent Office 3,341,779

Patented Sept. 12, 1967

3,341,779

DEMODULATOR FOR REFERENCE POTENTIAL CROSSING DATA-MODULATED SIGNALS

Leonard Kedson, Elberon, N.J., assignor to Electronic Associates Inc., Long Branch, N.J., a corporation of New Jersey Filed July 10, 1963, Ser. No. 293,942
22 Claims. (Cl. 325—322)

This invention relates to electronic data transmission, and particularly to an improved data receiver unit.

In electronic digital data-processing equipment, the information is commonly represented by a train of pulses whose presence or absence in successive clock intervals represents the data in binary code. But when it becomes necessary to transmit data in electronic form over long distances, as for example over telephone lines for use at a remote station, noise and hence errors have been induced in the data transmission. In addition, prior equipment has suffered from the disadvantage of requiring relatively complex electronic circuits.

It is an object of this invention to provide a data receiver which is quite simple and independent of critical circuits, which in fact employs standard digital circuitry throughout (e.g., flip-flops, one-shots, logic gates, etc.), and is therefore economical, while retaining the noise immunity and error-free characteristics of more complex and expensive systems.

Where telephone lines are employed for transmission, a particular problem is impulse noise, usually consisting of short-time spikes. Another object of the invention is to provides a very high order of immunity to this type of noise in data transmission systems. For this purpose, the receiver described in detail below includes a pulse noise minimizer circuit and timed gates controlled by the signal transmission to reject pulses occurring at times other than proper times.

Where binary data is to be transmitted, special transmitter modulating circuits are required to convert the original signal to that form. In addition, special receiver demodulating circuits are needed to reconvert the transmitted waveforms to the pulse form which is normally required by the data-processing equipment present at the receiving station. It is a further object of this invention to provide an improved and simplified demodulator circuit.

In accordance with the present invention, there is provided a system for demodulating transmitted data-modulated signals in the form of a data signal potential which crosses a reference potential during a clock interval to correspond to a first state bit and in the form of a data signal potential which does not cross the reference potential during a clock interval to correspond to a second state bit. The data-modulated signals are inverted and then both the data-modulated signals and the inverted data-modulated signals are each delayed by a similar predetermined time delay. The data-modulated signals and the inverted delayed data-modulated signals are applied to a first "and" gate to provide clock signals at the output of that gate. The inverted data-modulated signals and the delayed data-modulated signals are applied to a second "and" gate to provide data signals at the output thereof. In this manner, a data signal appearing intermediate in time between two successive clock signals corresponds to a demodulated first state bit while an absence of a data signal intermediate in time between two successive clock signals corresponds to a demodulated second state bit. It will be understood that a first state bit may represent a binary "one" and that a second state bit may represent a binary "zero" or vice versa.

It is another object of this invention to provide clock and data timed gates which take slices or samples in order to accept clock and data pulses, respectively, that should occur within these times of these samples and to reject impulse noises penetrating into the receiver at other times. This provision may achieve a high degree of improvement in noise immunity.

In spite of all the foregoing precautions, some errors may inevitably appear, such as those caused by sustained noise bursts. For this reason it is still another object of this invention to provide a spare data register provided in addition to a main register.

A correctly received entry is read out of the main data register to the data utilizing apparatus, and to the spare register. In case an erroneous "word" is received, the error is detected, and the previous correct data stored in the spare register is delivered to the data utilizing apparatus. The stored data in the spare or supplemental register is not replaced by new data until such new data has been found to be free of transmission errors. This apparatus is particularly valuable where gradually changing values represented in digital form are transmitted, and an erroneous value may be widely different from the preceding value and the next-following value in a gradually changing series of values. The correct data stored in the spare register will be suitably close to the immediately following erroneous data to be used in its place.

The foregoing objects, as well as further features, objects and advantages of the invention, will be appreciated from the following detailed description of an illustrative embodiment shown in the accompanying drawings, wherein:

FIGURES 3A and 3B are to be combined;

Figure 1:
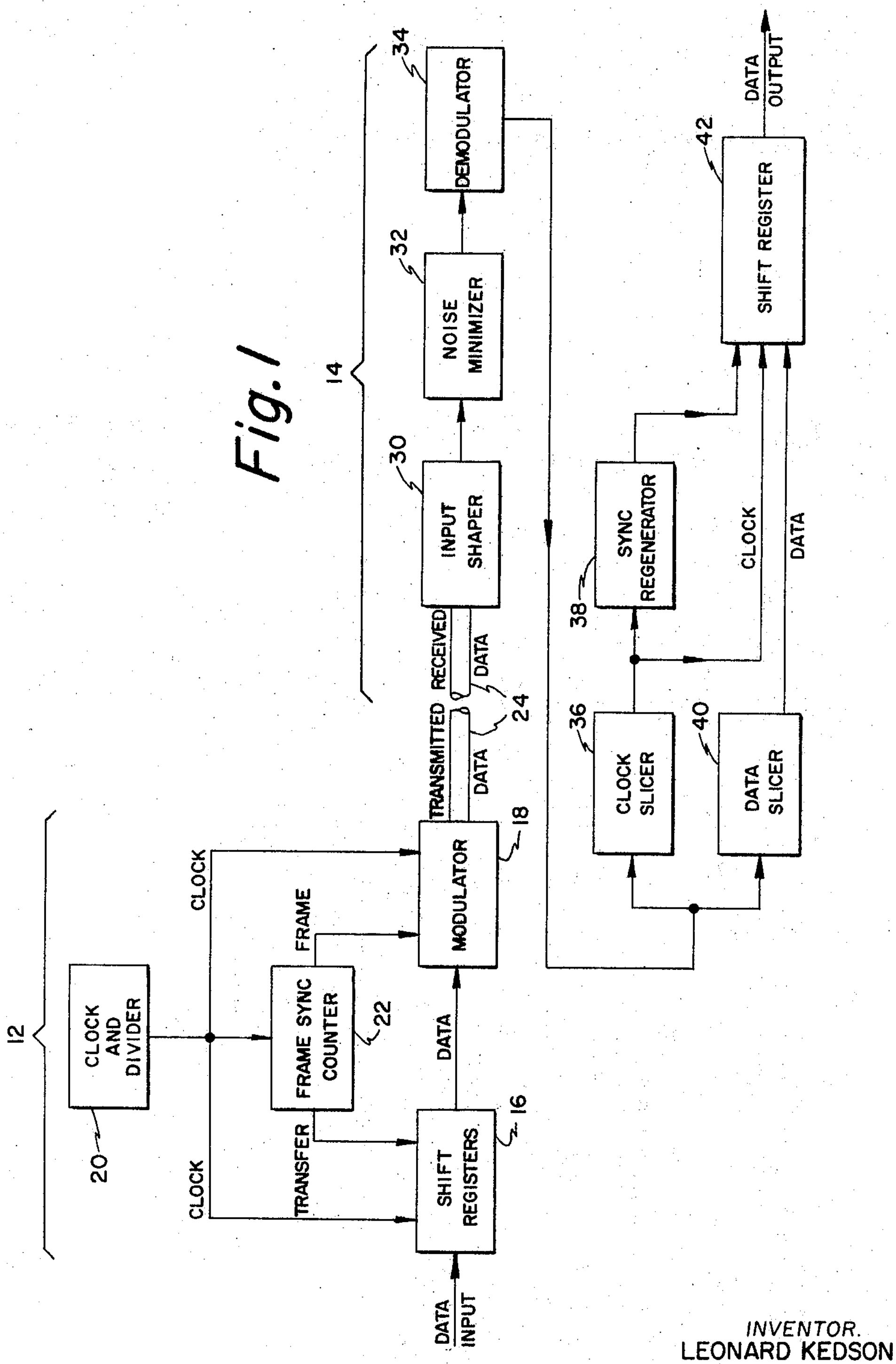
FIGURE 1 is a block diagram showing the overall system for data transmission employing features of this invention.

Referring specifically to the drawings, FIGURE 1 shows in block diagram form an illustrative data transmission system employing novel features of this invention. This system comprises separate data transmitter and data received units, generally designated 12 and 14, respectively. Data is available to the transmitter 12 from many differing sources well-known in the art, as for example, from an analog-to-digital converter or an electronic computer, and is fed to one or more shift registers 16 for encoding. The binary information may generally be in the form illustrated in FIGURE 2C in which, for example, the higher of two voltage levels during a clock interval 13 represents binary "one" and the lower level *x* represents binary "zero." Such pulse systems are characterized by the fact that a given voltage level always represents a given binary value. For example, presence of a high level during a clock interval always signifies "one" and a sustained low level in a clock interval always signifies "zero."

To prepare the pulse train for transmission, it is converted to a modulated signal by a modulator 18 into a signal of the type disclosed in a copending application, Ser. No. 293,989, now U.S. Patent No. 3,251,051, by the present applicant and Wolfgang Harries for Data-Modulated Transmitter, filed concurrently herewith and assigned to the assignee of the present application. In this type of system, regardless of which voltage polarity the pulse train starts with, the data is represented either by a change of potential within a clock-pulse interval or by a lack of such a change. In the illustrative apparatus, a change of potential in either direction represents binary "one" and the absence of any change of polarity within a clock pulse interval represents binary "zero." At the end of each clock interval, there is always a change of polarity.

Figure 2:
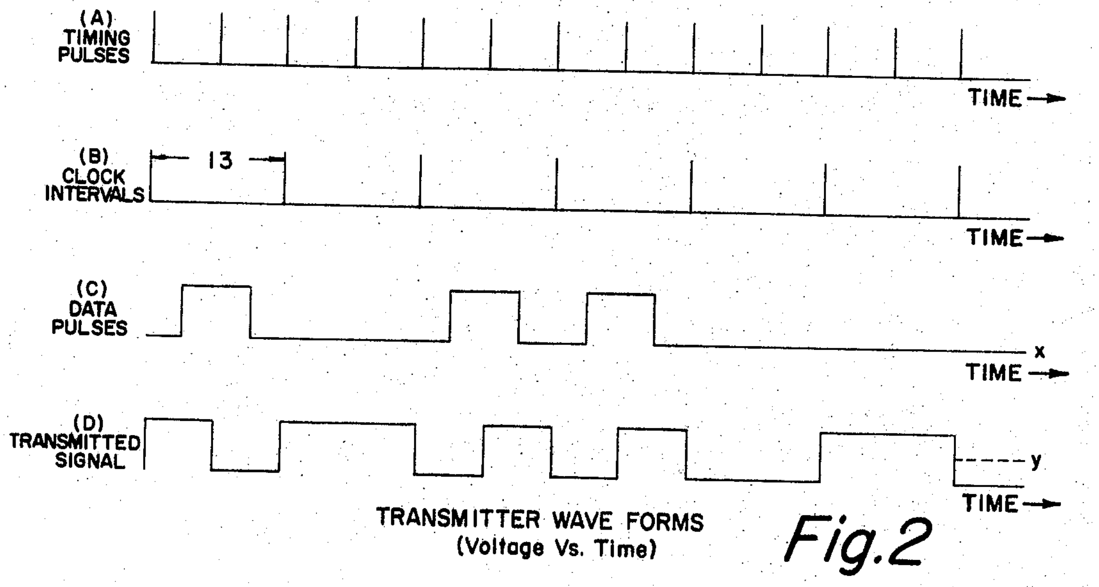
FIGURE 2 is a set of waveforms illustrating operation of the transmitter in the system of FIGURE 1.

The data signal C of FIG. 2 is converted to the modulated signal D. If the level designated *y* is called the zero level, then the signal crosses zero at the start of each clock interval; but within each clock interval the signal either crosses the zero or reference level or does not cross it, depending on wether the data is respectively a "one" or a "zero" in that interval.

The data pulse train C is shifted out of the register 16 into the modulator 18 under control of clock-pulse generator 20 that produces timing pulses A, FIG. 2. A frame synchronizing counter 22 is also provided, to divide the transmission into "words" of 97 bits each, for example, including 90 data intervals and 7 error-coding parity bits, plus 3 end-of-frame clock intervals reserved for frame identification. It will be understood by those skilled in the art that a word may have any desired number of bits and including a selected number of data frame and parity bits.

Modulator 18 converts the shift register output into a rectanguluar-shaped wave representation of the same data and sends it out over a transmission link 24. Such modulated data signals may be used to modulate high frequency carriers, as where several modulated data signals are to be multiplexed, or the modulated data signals may be directly applied to a conventional two-conductor telephone line 24 leading to the data receiver 14. Signals of the form appearing at the input end of the receiver in U.S. Patent No. 3,032,745, issued May 1, 1962, to Howard Hamer and assigned to the assignee of the present application, may also be used in the type of receiver to be described.

The receiver 14 of this invention is especially adapted to utilize rectangular-shaped data signals D shown in FIG. 2, even badly distorted or degraded signals resulting from transmission over a telephone line not especially designed for the high-frequency constituents of the transmitted signal. It comprises a conventional shaper circuit 30 which helps in restoring the rectangular-shaped waveform of the transmitted signal as received. The output of the shaper circuit 30 then goes to a novel pulse noise minimizer 32. This device removes spikes or spurious pulses of short duration introduced during telephone line transmission. The signal is next applied to a novel demodulator 34 which reconverts the signal to demodulated form. At this point the signal could be utilized for conversion into form C (FIG. 2), in which pulses of rectangular-shape and absences of such pulses during successive clock intervals represents the data, the form utilized in the present data-processing equipment. However, this output is applied in the illustrative apparatus to novel apparatus for further improving reliability, including clock slicer 36 and data slicer 38, after which waveform C is reconstituted. Clock pulses are applied to a synchronizing frame regenerator 40. The output clock and data signals are brought to shift registers 42. In the event of an error, the data previously stored in a spare data register is used as data output; otherwise, the received data is used as data output and the same error-free received data is read into the spare data register.

*Input shaper 30*

Figure 3A:
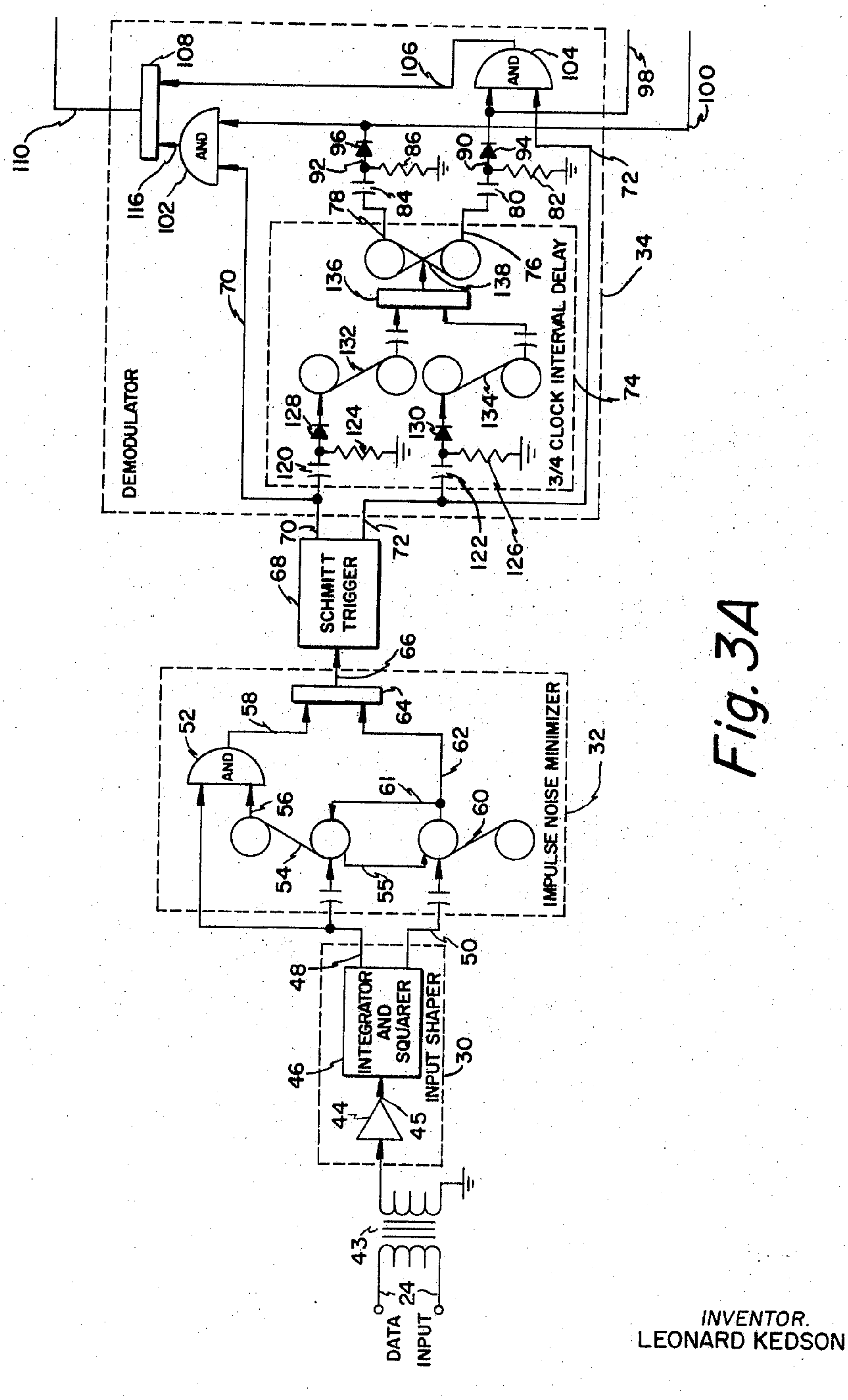
FIGURE 3A and 3B are respective parts of a diagram showing the data receiver of FIGURE 1 in greater detail.
Figures 3B, 3C:
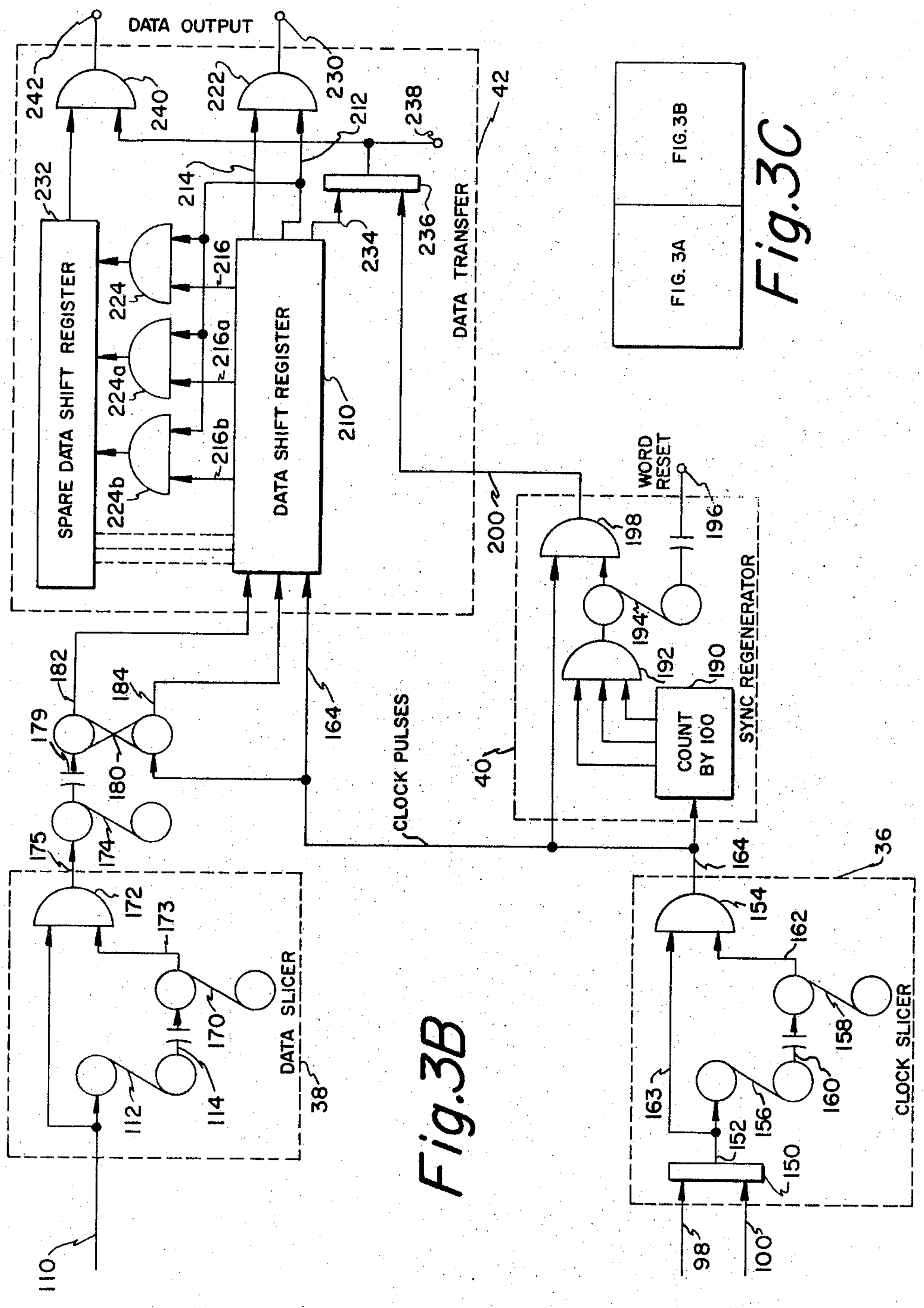
FIGURE 3C illustrates how

Attention is next directed to FIGS. 3A and 3B which include the block diagram of the receiver in FIG. 1, additionally showing the circuit details of the entire data receiver 14. FIG. 3A in particular illustrates the input shaper 30, impulse noise minimizer 32, and demodulator 34. The input from the transmission line 24 is taken across the primary of an isolation transformer 43. The secondary output goes to an amplifier 44 and then over a lead 45 to a conventional integrating and shaping circuit 46 which provides two output signals, including a normal signal on lead 48 and an inverted version of the same waveform on lead 50. Looking ahead for a moment to FIG. 4, a comparison of the degraded signal on lead 45 with the squared and shaped complementary signals on leads 48 and 50 illustrates the action of the circuit 30.

*Impulse noise minimizer 32*

The two complementary data input signals on leads 48 and 50 are applied to the impulse noise minimizer 32. The normal data input on lead 48 is applied directly to an "and" gate 52. The input on lead 48 is also capacitively coupled to a "one-shot" or monostable multivibrator 54 which responds only to positive-going triggering pulses and (see FIG. 4) produces a negative-going square-wave output. The "one-shot" pulse has a short duration compared to the clock interval, for example about 10 percent. This is considerably shorter than the shortest signal pulse duration, but it is chosen to be longer than most noise spikes. The output of "one-shot" 54 is applied over a lead 56 to the other input of the "and" gate 52. From FIG. 4, an uncorrupted input on lead 48 is seen to comprise a train of positive rectangular-shaped pulses or signals. The rising edge of each pulse triggers the monostable circuit 54. The resulting monostable output on lead 56 is a negative-going pulse coinciding with the earliest part of the related signal pulse from lead 48. The gate 52 in which these input signals are added requires positive input potential at each of its input terminals. Negative pulses on lead 56 suppress response of gate 52 to the coinciding parts of the signal pulses on lead 48. After the end of the "one-shot" pulse, the remainder of each signal pulse on lead 48 is allowed to pass. Thus the gate output on lead 58 is the train of signal pulses with their leading edges delayed by the period of the monostable circuit 54 as shown in FIG. 4.

The resulting shortening of the signal pulses is repaired by adding a corresponding increment at the end of each pulse. The inverted signal on lead 50, which consists of a train of negative-going pulses, is capacitively coupled to another "one-shot" or monostable multivibrator 60. The latter responds to positive-going wave-fronts to produce a positive-going output on lead 62 which is at least nearly equal in duration to that of the other "one-shot" circuit 54. The "one-shot" circuits 54 and 60 are cross-connected by leads 55 and 61 for mutual inhibition, so that each does not respond to an input signal during the "on" period of the other. The two pulses trains on leads 58 and 62 are added in an "or" gate 64. As seen in FIG. 4, the positive-going pulses on lead 62 are triggered by the positive-going trailing edges of the signal on lead 50, and therefore they occur upon termination of the pulses on lead 48. Because the pulse train on lead 50 is an inversion of that on lead 48, the pulses on lead 62 can also be said to occur upon the termination of the associated positive-going signal pulses on lead 48. Therefore, in the gate output on lead 66 the "one-shot" pulses from lead 62 are added at the end of the associated signal pulses from lead 58, to lengthen them. Since "one-shot" circuits 54 and 56 have about the same period, the loss at the leading edges of the signal pulses is compensated by the additions at the trailing edges. The net effect of impulse noise minimizer 32 on the uncorrupted signal on lead 48 of FIG. 4 is to delay it by the period of the "one-shots" 54 and 60.

Figure 4:
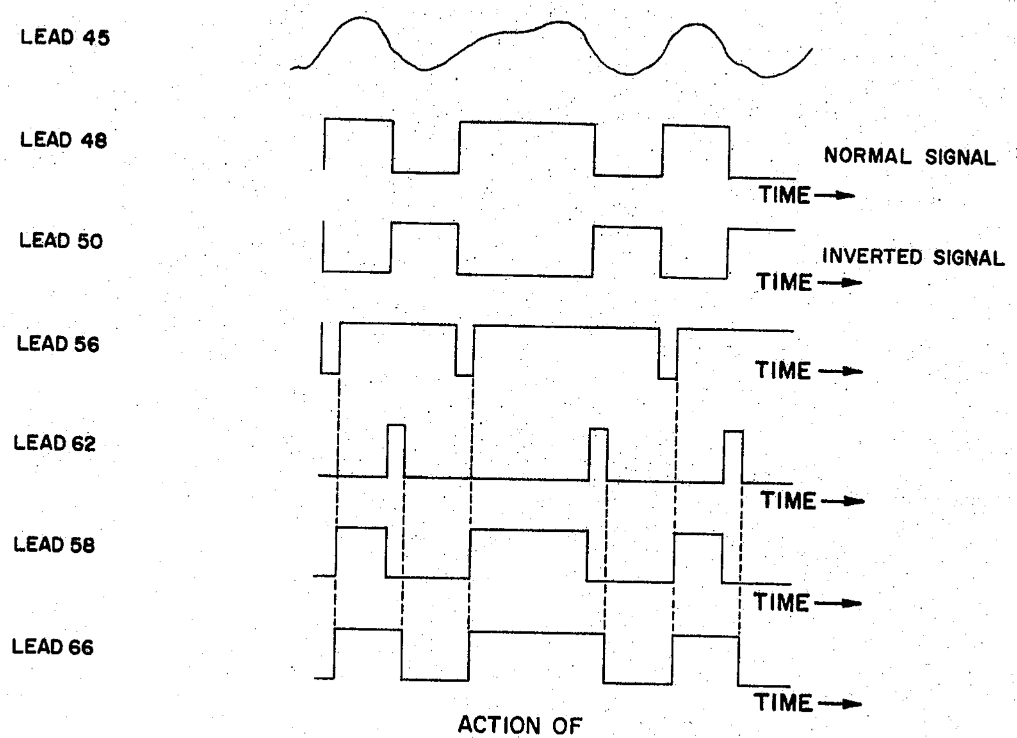
FIGURES 4–6 are signal waveforms illustrating the action of the impulse noise minimizer in FIGURE 3A, first on uncorrupted signals and then on two different types of impulse-noise-corrupted signals, respectively.
Figure 5:
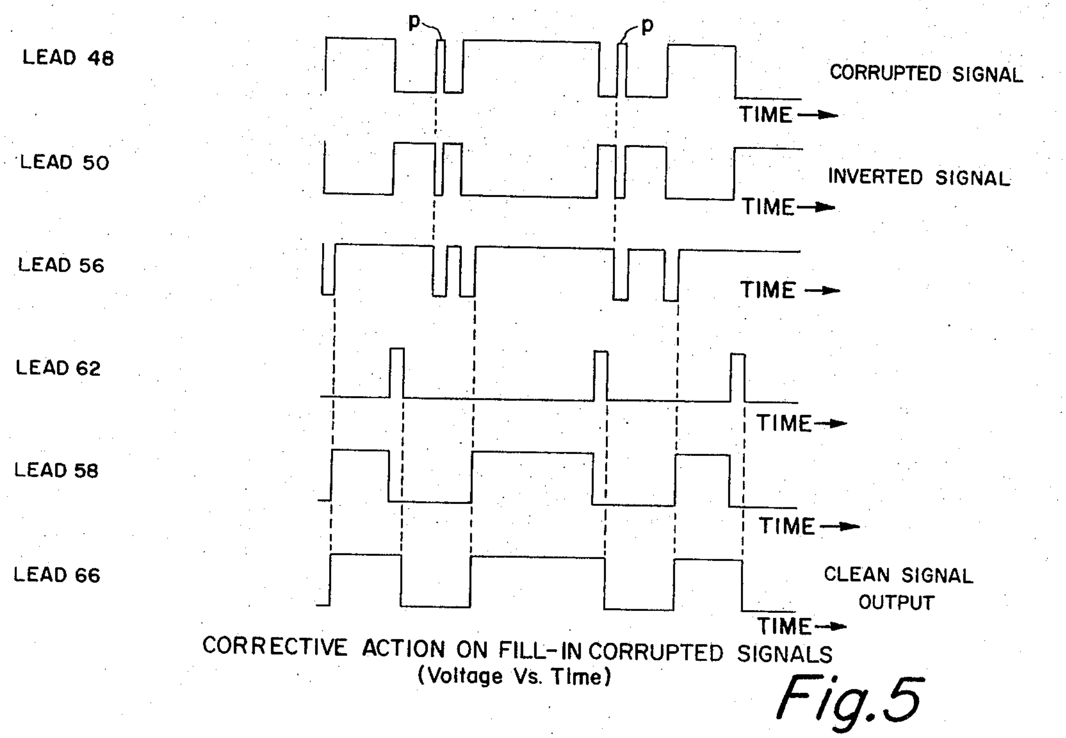
Figure 6:
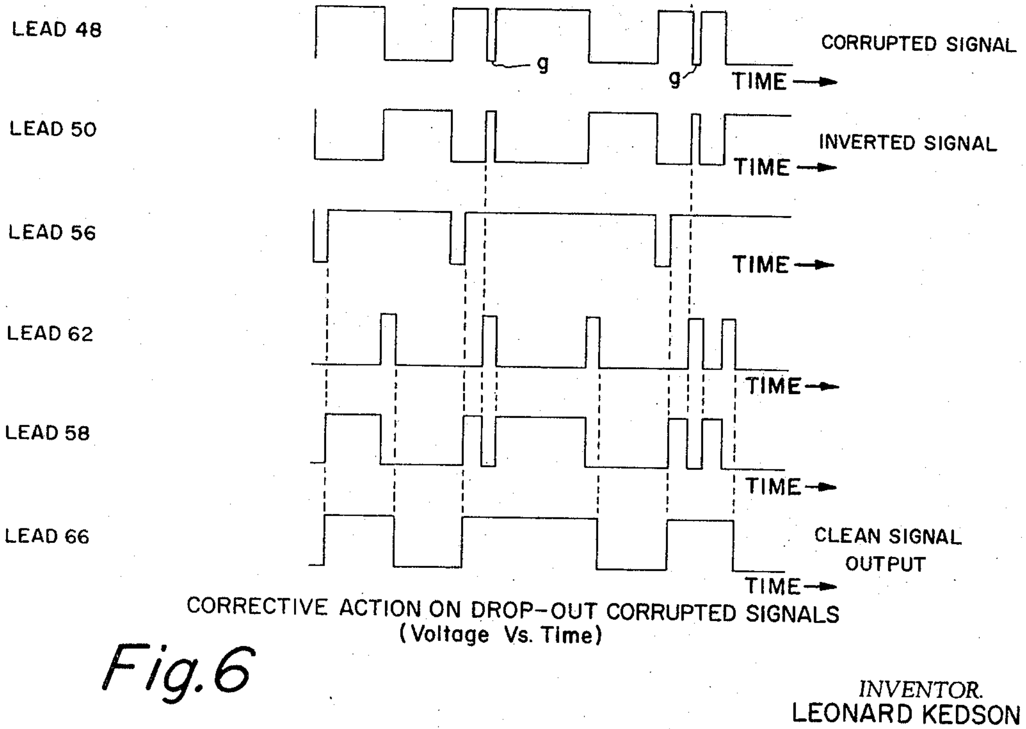

FIGS. 5 and 6 illustrate the corrective action of the impulse noise minimizer of FIG. 4 on signals corrupted by noise spikes which are of short duration in comparison to the period of the "one-shot" circuits 54 and 60. FIG. 5 deals with noise of the fill-in type; i.e., spurious positive-going pulses *p* occuring during intervals when the signal voltage is at its lower level. Once again the signal applied to lead 48 appears at the output 66 delayed by the period of the "one-shot" circuits. In addition, the noise pulses *p* originally present in the input on lead 48 are removed from the output on lead 66. This is due to the action of the "one-shot" circuit 54, which is triggered by the rising leading edge of a fill-in noise spike. The resulting negative-going one-shot output pulse on lead 56, when added in the gate 52 with a positive-going noise spike *p* of equal or shorter duration, cancels the noise pulse *p* completely and keeps the voltage on lead 58 clamped to its lower level throughout the period required by the true signal.

FIG. 6 similarly shows the manner in which the signal in delayed and purged of drop-out noise, i.e., spurious negative-going gaps *g* occurring during a high-level portion of the signal. The falling leading edge of a drop-out gap *g* has a corresponding rising front on lead 50 that triggers one-shot circuit 60. The resulting positive-going "one-shot" pulse on lead 62, when added in the gate 64 to the noise-corrupted signal on lead 58 (FIG. 6), restores the waveform at lead 66 to its true shape. "One-shot" 60 fills in the gap, provided the spike duration is not longer than the period of the "one-shot." The resulting output on lead 66 is purged of the drop-out corruption.

Summarizing the action of the impulse noise minimizer, one of the monostables 54 and 60 responds to short-duration noise spikes occurring between signal pulses, and the other responds to short-duration noise spikes that would otherwise produce a gap within a signal pulse. In each case, the "one-shots" 54 and 60 produce an output pulse of proper polarity which is combined with the noise for cancellation. The two monostable circuits also respond to the leading and trailing edges of signal pulses, but here their action is self-compensating and results only in a delay of the signal.

*Data demodulator 34*

Figure 7:
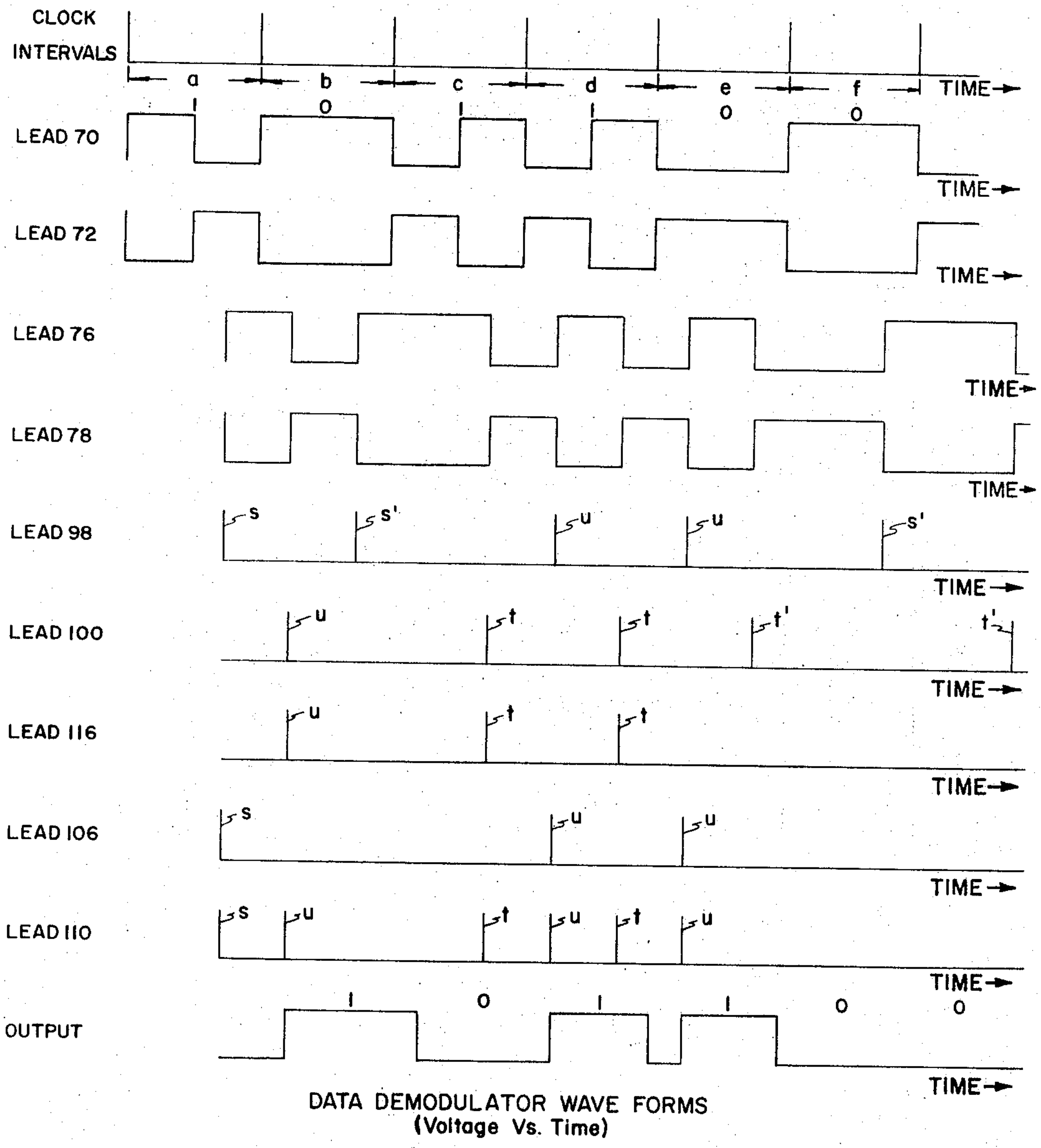
FIGURE 7 is a set of waveforms illustrating the operation of the data demodulator in FIGURE 3A.

The data demodulator is shown in detail in FIG. 3A, while the corresponding waveforms at various locations in the circuit are seen in FIG. 7. The voltage on lead 66 operates a Schmitt trigger 68 which does not respond to signals below a certain value, and which may be treated as spurious. This trigger responds to strong signals and provides a pair of output trains. One of these, on the lead 70, is the squared and shaped input signal, purged of virtually all short-term noise spikes by the impulse noise minimizer 32. The other pulse train, on lead 72, is an inverted version of the same waveform. The normal input signals on leads 70 and 72 are applied to a circuit 74 which introduces a delay of about three quarters of a clock interval, and supplies two output signals. (In order not to interfere with the explanation of the demodulator 34, the description of this delay circuit 74 is deferred.) One of these delayed output signals, on lead 76, is the normal signal of lead 70, but delayed. The other, on lead 78 is an inverted version of the delayed signal. These delayed waveforms are applied to respective differentiating networks. Specifically, the normal delayed signal on lead 76 is applied to the differentiating network comprising the series capacitor 80 and the grounded shunt resistance 82. Similarly, the network of the series capacitor 84 and grounded shunt resistance 86 differentiates the inverted delayed signal from lead 78. The output of the differentiating networks on leads 90 and 92 comprise positive spikes representing the rising pulse edges, and negative spikes representing the falling pulse edges of the respective pulse trains from leads 76 and 78. Diodes 94 and 96 are connected to block the negative spikes and pass only the positive ones. Therefore, the voltage on lead 98 is a series of positive spikes representing the positive-going zero-crossings of the normal delayed signal on lead 76, while the voltage on lead 100 is a series of positive spikes representing the positive-going zero crossings of the inverted delayed signal on lead 78, which is the same as saying negative-going zero-crossings of the normal delayed signal.

The normal undelayed signal on lead 70 is then brought together with the differentiated delayed waveform on lead 100 in and "and" gate 102, and the same is done for the undelayed pulse train on lead 72 and the differentiated delayed waveform on lead 98 in an "and" gate 104. Note that in this circuit, due to the relative polarities of signals and differentiated signal spikes, it is the *normal* (i.e., uninverted) signal on lead 70 which is "anded" with the spike waveform (lead 100) derived from the *inverted* pulse train on lead 78, while the *inverted* version of the signal on lead 72 is "anded" with the spike waveform (lead 98) derived from the *normal* pulse train on lead 76.

The effect of this arrangement is best understood by considering the signals appearing at various times at certain points in the circuit as shown in FIG. 7. The supplied signals under consideration vary between zero and a level of given polarity, assumed to be positive. In such a system, there are two possible conditions that represent binary "one." First, there can be a positive-going zero-crossing at the beginning of a clock interval followed by a negative-going zero-crossing in the middle of the clock interval and, secondly, there can be a negative-going zero-crossing at the beginning of a clock interval followed by a positive-going zero-crossing in the middle of that clock interval. See, for example, clock intervals *a* and *c* in the waveform of lead 70.

The first situation representing binary "one" is detected by "and" gates 102 and 104, in producing a spike *s* followed by a spike *u* on line 110.

Spike *s* on lead 98 results from differentiating the rising front of the delayed signal on lead 76 corresponding to the start of clock interval *a*. In gate 104, positive spike *s* occurs during the second half of clock interval *a*, when the inverted binary "one" signal on lead 72 is also positive. Spike *s* is transmitted to lead 106, through "or" gate 108, to lead 110.

Spike *u* on lead 100 results from differentiating the rising front of the delayed signal on lead 78 corresponding to the middle of clock interval *a*. In gate 102, positive spike *u* occurs when the signal on lead 70 is positive, during the first half of the clock interval *b* immediately following the binary "one" cycle. Spike *u* on lead 100 is transmitted by gate 102 to lead 116, through "or" gate 108 to lead 110.

Spike *s* is a clock pulse which occurs at the beginning of a delayed clock interval in which a binary "one" was received. Other clock-pulse spikes *s'* appear on lead 98, but these occur at the beginning of delayed clock intervals representing binary "zero." They do not pass gate 104 because of the low value of the inverted binary "0" signal on lead 72 during the second half of that clock interval. A clock pulse *s* is transmitted by gate 104 only in a clock interval when a data pulse *u* passes gate 102.

The other condition of the system in which binary "one" can be represented is exemplified in clock interval *c*. In that case, a rising signal on lead 78 is converted to a clock spike *t* on lead 100 at the beginning of the delayed clock-interval *c*. This occurs during the second half of clock interval *c*, when the signal on lead 70 is positive. Clock spike *t* passes through gate 102, to lead 116, through "or" gate 108, to lead 110.

Similarly, data pulse *u* results on lead 98 when the delayed binary "one" signal on lead 76 has a rising front in the middle of the delayed clock interval. This is applied to gate 104 together with the positive first-half of the clock interval *d* that follows immediately after the binary "one" cycle of clock interval *c*. The data pulse *u* passes gate 104, lead 106 and "or" gate 108, to lead 110.

In addition to the clock pulses *t* and the data pulses *u*, other clock pulses *t'* develop on line 100, but these occur when the inverted signal on lead 72 is low. Consequently, gate 104 suppresses clock pulses *t'*, these clock pulses corresponding to binary "zero" clock intervals.

It is a characteristic of the present system that there is a "zero-crossing" in the squared received signal at the end of each clock interval. This explains why a data spike is obtained either:

(1) By comparing the rising front at the middle of a normal (not inverted) binary "one" delayed signal with the inverted signal during the first half of the clock interval following a binary "one" clock interval, or (2) By comparing the rising front at the middle of an inverted delayed binary "one" cycle with the normal signal during the first half of the clock interval following a binary "one" clock interval.

Gate 102 and gate 104 transmit clock pulses and data pulses one-half of a clock interval later (but not respectively) in response to a binary "one" transmission. Gates 102 and 104 suppress clock pulses at other times; and no data pulses are developed for gates 102 and 104 in response to binary "zero" transmissions.

Pulse-pairs *s* and *u*, or *t* and *u* represent detected binary "one" representations of the transmitted signal. These pulse-pairs are converted, in a manner detailed below, to output pulses of the form designated "Output" at the bottom of FIG. 7, customarily recognized by data-processing apparatus.

The demodulator may be used without the data slicer. The original data pulses *c* can be restored directly from the output pulse-pairs *s*, *u* and *t*, *u*. Thus, by impressing such pairs of pulses on a monostable multivibrator having a longer "on" time than the space between the pulses of each pair, but shorter than the clock interval, the data pulse train C results. Pulses *s* and *t* trigger such a multivibrator and pulses *u* then become nonsignificant.

Returning now to an explanation of the delay circuit 74, the complementary signals on leads 70 and 72 are applied to respective differentiating networks comprising respective series capacitor 120 and 122, and corresponding grounded shunt resistors 124 and 126. The resulting trains of positive and negative spikes are screened by diodes 128 and 130 respectively, to remove the negative spikes. The remaining positive spikes trigger "one-shot" or monostable multivibrator circuits 132 and 134 to produce a single multivibrator output pulse for each pulse of the incoming signal trains on leads 70 and 72, respectively. These output pulses are capacitively coupled to an "or" gate 136 which applies the pulses from both "one-shot" circuits to flip-flop 138. The flip-flop is switched in response to the trailing edges of the "one-shot" pulses. In each state, the flip-flop provides a high output on one of the leads 76 or 78, and a low output on the other. These output signals are complementary, one being a delayed replica of the "normal" or uninverted signal (that is identified for reference as the signal on lead 70) and a delayed and inverted replica of that signal. The three-quarter clock interval delay arises because that is the period of the "one-shot" circuits 132 and 134, and the flip-flop 138 is switched in response to the trailing edges of the "one-shot" output pulses.

Summarizing, the data input to delay circuit 74 is presented in "normal" and "inverted" forms. These are differentiated and used to trigger "one-shot" multivibrators which serve as three-quarter-cycle storage units. Then the delayed output signals are added and used to trigger a flip-flop having output points providing "normal" and "inverted" complementary output signals. By switching back and forth, the flip-flop reconstitutes the output signal pulses of "one-shots" 132 and 134 into two complementary, delayed replicas of the "normal" signal impressed on the delay unit 74.

*Slicers 36 and 38*

For greater immunity of the data transmission from noise, both the data pulses and the colck pulses are fed separately to respective slicers 36 and 38. Both clock pulses and data pulses would occur at precise times in an ideal system. It would then be theoretically possible to provide gates that would open momentarily to pass data pulses when present, and to pass recurrent clock pulses. This would enormously reduce the possibility of spurious pulses penetrating into the processing end of the apparatus. However, it is not possible to prescribe exactly when data and clock pulses must occur, in a practical system, due to various distortions of the transmitted signals. Clock and data pulses may occur at random times sooner or later than their theoretical times, within a limited latitude of variation. The clock and data slicers include respective gates that block clock-pulse input and data transmissions in the processing apparatus except during those narrow parts of each clock pulse cycle when such pulses should occur under practical conditions. Since each gate is closed during most of the clock-pulse interval, there is a corresponding multiplication in noise rejection. For example, if each gate is open for only 100 microseconds in a system having 500-microsecond clock-pulse intervals, then there is an 80 percent gain in noise rejection in the transmission.

Figure 8:
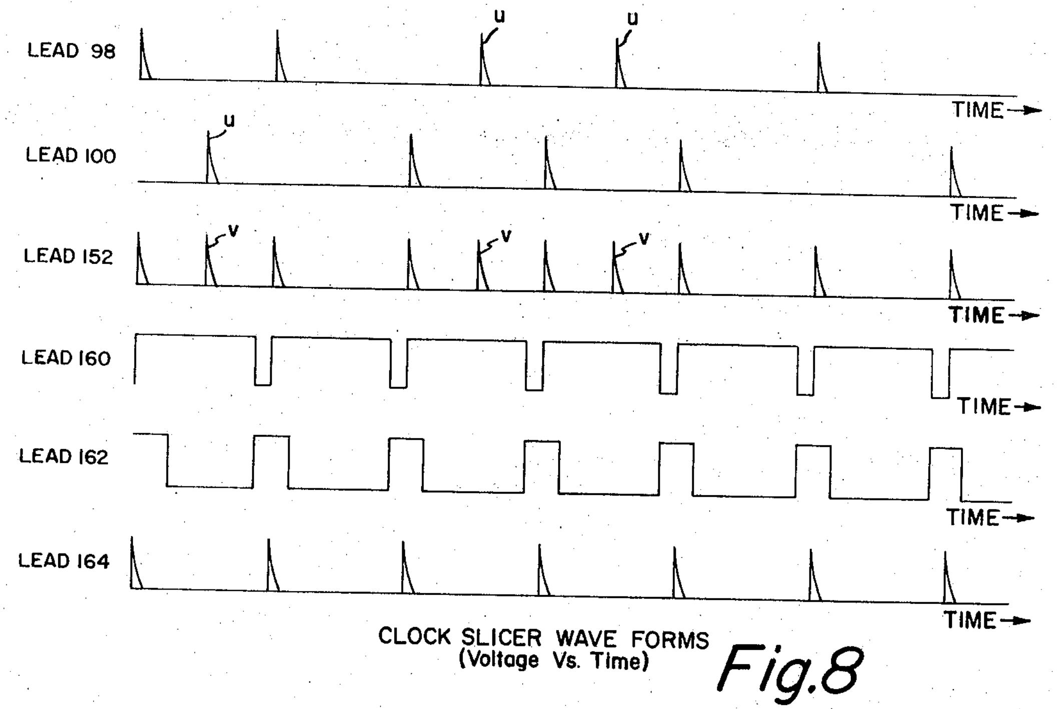
FIGURE 8 is a set of waveforms illustrating the operation of the clock slicer in FIGURE 3B.

The clock slicer 36 receives input pulses from leads 98 and 100 of the demodulator 34 (FIG. 3A). The waveforms appearing on these leads, which are reproduced in FIG. 8, comprise two series of positive spikes. These spikes are added in an "or" gate 150. The gate output on lead 152 is seen to contain all the information necessary to constitute a clock output, i.e., a series of start-of-interval spikes. The spikes *v* are also present, corresponding to data pulses *u* on leads 98 and 100. The clock-pulse slicer deletes these spikes along with any noise spikes occurring during most of the cycle. The gate output on lead 152 is applied directly to an "and" gate 154. The input on lead 152 is also fed to a cascade of two "one-shot" or monostable multivibrators 156 and 158. The first of these has an "on" time of 90 percent of the clock-pulse interval, and the second has an "on" interval of 20 percent of the clock interval, in a system proportioned to accommodate a 20 percent latitude in the time when clock pulses must occur. It may be assumed that the first "one-shot" circuit 156 has responded to the first (delayed) clock spike *s* or *t* of a frame of data. Thereafter, "one-shot" 156 remains triggered well past the middle of the clock interval and during that time it is immune to further triggering, whether by pulses *v* or by noise spikes. The "one-shot" pulses on lead 160 are capacitively coupled to the other "one-shot" circuit 158. The latter is triggered "on" by the trailing edges of its input pulses. Thus the second "one-shot" circuit 158 provides output pulses on lead 162 which extend from a time that starts 10 percent before the ends of the clock intervals and terminates 10 percent after the ends of the clock intervals, in the example given. These pulses are directly coupled to gate 154 and allow only the end-of-interval spikes to pass the "and" gate 154 to emerge on the lead 164. Noise on line 136 that might occur during the remaining 80 percent of each clock interval, as well as mid-interval pulses *v* are blocked. The pulses transmitted by gate 154 are clock pulses, with some small possibility of noise occurring during the time when a clock pulse is needed in the data-utilizing apparatus that receives the signal. A noise spike at such a time and of an intensity to simulate a clock pulse could well be used as the clock pulse of that interval.

The fact that portions of the transmitted signal are utilized in providing clock pulses in the receiver, and that it is permissible for such pulses not to recur strictly at regular time intervals, forms the basis of advantageous asynchronous operation, in which all timing information is derived directly from the incoming data.

Figure 9:
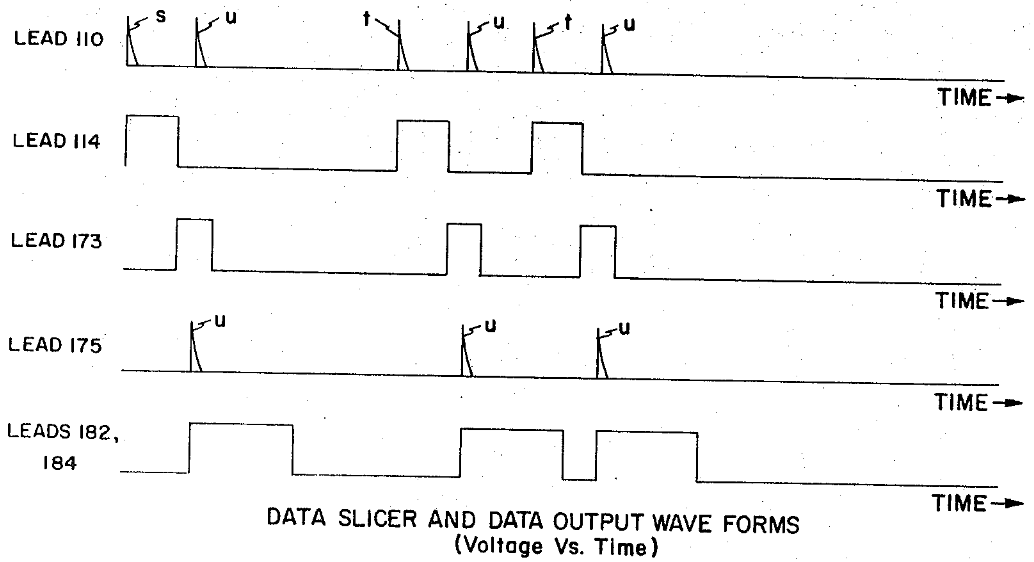
FIGURE 9 is a set of waveforms illustrating the operation of the data slicer and the data reconstituting portions of FIGURE 3B.

The data slicer 38 is very similar to clock slicer 36 in construction and in operation. As previously explained, data slicer 38 receives spikes on lead 110 (FIGS. 7 and 9) from the demodulator 34 (FIG. 3A) and applies them to a "one-shot" circuit 112 to produce a pulse train on the lead 114 (FIG. 9). These pulses are 40 percent of a clock interval in duration, if it is assumed that the data pulse *u* must occur at the middle of a clock interval following a clock pulse *s* or *t* within a permissible latitude of plus or minus 10 percent of the normal clock interval. The trailing edge of the "on" pulse of "one-shot" 112 is capacitively coupled to a second such "one-shot" circuit 170 which then produces short pulses of 20 percent of a clock interval (for example) coinciding with the times in the clock intervals when pulses *u* should occur. These pulses are directly coupled to gate 172 by lead 173 and are used to gate the transmission of spikes on lead 110 through "and" gate 172, limited to the center 20 percent of the clock interval in the example considered. Thus in the same manner as for the clock slicer, the extraneous spikes other than mid-interval data spikes *u* on the lead 110 are removed by the data slicer.

*Reconstituted data output*

Spikes *u* are applied to a "one-shot" or monostable multivibrator circuit 174 having an "on" time of about three-fourths of a clock interval, making this multivibrator non-responsive to input pulses during that time. The leading part of the output wave of multivibrator 174, timed to coincide with spikes *u* on lead 175, is coupled via capacitor 179 to trigger flip-flop 180. Clock pulses from the data slicer 36 on lead 164 reversely trigger flip-flop 180. As a result, data pulses appear between leads 182 and 184 as shown in FIG. 9 and, as mentioned previously, at the bottom of FIG. 7.

*Synch regenerator 40*

In this circuit, the clock output on lead 164 is applied to a counter 190. In the example shown, this is a scale-of-one-hundred counter for a frame length of one hundred bits. In this example, the frame includes 97 bits for data (information and error-coded bits) plus a time interval of three bits for frame synchronization. Particular output points of counter 190 representing a count of 97 are brought together at the input to an "and" gate 192. Upon accumulation of 97 clock pulses, there is coincidence of these output points of teh counter, and gate 192 passes an end-of-word clock spike to trigger a "one-shot" or monostable multivibrator circuit 194. "One-shot" 194 has an "on" time of almost three clock intervals. An output signal is produced at the end of the "on" time of "one-shot" 194, and this is capacitively coupled to a terminal 196 to provide a word reset pulse. Suitable connections (not shown) extend from this terminal to all parts of the receiver where it may be desirable to effect reset to a particular condition at the start of a new word, and to counter 190 and unit 42, where reset may be necessary or desirable.

"One-shot" circuit 194 is directly coupled to an "and" gate 198. This gate blocks the clock spikes on lead 164 until a count of 97 is reached, in the example shown. "And" gate 198 is open for a time interval nearly equal to three clock intervals after count "97" is reached, with the result that any spikes appearing on line 164 are transmitted as an "error" control signal to "or" gate 236. No such spikes should appear since the transmitter sends no signals for three clock intervals, as a frame marker. If pulses appear on line 200, that indicates the presence of high-level noise on the transmission line, and this may be taken as signifying unreliable data due to transmission noise.

*Shift registers 42*

The shift register unit 210 receives data input pulses on leads 182 and 184, plus the clock input spikes from lead 164, that time the serial entry of data into the data shift register in unit 210. Shift registers are well-known in the art and may take many different forms. As for example, shift registers are described in detail in "Pulse & Digital Circuits," by Millman and Taub, McGraw-Hill, 1956, at p. 412 et. seq., and p. 425 et. seq.

Upon completion of this serial entry of data, it will be understood by those skilled in the art that data may be checked to determine if any errors have occurred and desired error detection circuitry may be incorporated in unit 210. It will be understood that errors may be revealed by using the same error-coded polynominal used in the transmitter in an inverse operation compared to that used in producing the error-coded signal that was transmitted. The result should be zero if the data was not corrupted in transmission, as by noise.

When the data is found to be error-free, an indication of that fact is given in the form of an output on lead 212. This output allows parallel output shift of the data on parallel shift leads 216, **216*a*, 216*b* . . . and so on, and through "and" gates 224, 224*a*, 224*b* . . . and so on, to a data output terminal 230 and to spare data shift register 232. The output on the terminal 230 can be applied to any further data-processing equipment present at the receiving station. On the other hand, if an error is detected, the error-indicating bit appears as an output on lead 234, and this output will pass through the "or" gate 236 to provide an error signal on the terminal 238. This output also goes to the "and" gate 240 to allow the spare data shift register 232 to deliver the stored last previous correct data through the gate 240. Thus, the last-processed data is available at an alternative output terminal 242 in the event that transmission of error-containing data in the circiut 210 is blocked due to error-detection. In the event of an error, then, the circuit 42 does not pass along the erroneous data, but instead substitutes the last-processed correct data as the output of the receiver 14**. This process of substituting the most recent verified data for current unreliable or erroneous data is especially suited to the transmission of analog information which typically lacks sharp discontinuities. As a matter of prediction and interpolation, it is reasonable to reject a block of data known to contain an error which may possibly cause a very large variation from the correct numerical value, and substitute in its place the preceding value which is likely to differ by only a little.

As above indicated, error-detection circuitry may be incorporated in unit 210 and such circuitry may be any one of the types well known in the art and examples are described in detail in "Digital Computer and Control Engineering" by Robert Steven Ledley, McGraw-Hill, 1960.

Error-detection techniques may have a theoretical capability of detecting over 99 percent of burst errors of the type which are often introduced by telephone line transmission. This gives the system the ability to detect burst noise of any length, including longer term bursts which exceed the capacity of the impulse noise minimizer 32 and which may be instrumented in a simple manner by means of well known circuitry such as shift registers and "exclusive or" circuits. The technique involves treating binary digits as the coefficients of a polynomial which follows the rules of normal algebra, with all addition being modulo 2. Encoding may be done in the coding registers 16 of the data transmitter 12 by forming a coding polynomial and dividing it into the message polynomial, the latter consisting of the data bits plus the parity bits. The division remainder is added to the message to form a new encoded polynomial, which is then sent to the receiver 14. A portion of the circuit 210 may perform the inverse operation for decoding in an instantaneous operation at the end of the serial data entry operation. If the received polynomial is divisible by the original seventh order polynomial with which it was encoded, the remainder will be a string of zeros constituting the absence of an error indication. If there is a remainder, one or more of these zeros is replaced by a one-pulse which serves as an error-indicating bit.

The data receiver described above represents the preferred embodiment of various features of the invention, but evidently various changes may be made in a manner that would use some, but not all, of its advantages. For example, at the expense of reduced reliability, data spikes and clock spikes derived directly from the squared signal can be impressed on the clock slicer 36 and the data slicer 38, and then the resulting output would provide a train of clock pulses and would operate the data pulse generating flip-flop 180, as shown. With the bulk of the impulse noise removed by noise minimizer 32, the squared signals on leads 70 and 72 may be differentiated and utilized in the clock slicer and the data slicer directly, without including demodulator 34, its delay unit 72 and the associated gating circuit shown.

The illustrated receiver is the preferred apparatus for providing clock pulses and data for data-processing apparatus, and for providing continuity of data despite rejection of erroneous received frames. But since the novel features may be variously applied and modified by those skilled in the art, so the invention should be broadly construed in a manner consistent with its full spirit and scope.

What is claimed is:

1. A system for demodulating transmitted data-modulated signals in the form of a data signal potential which crosses a reference potential during a clock interval to correspond to a first state bit and in the form of a data signal potential which does not cross the reference potential during a clock interval to correspond to a second state bit comprising, means for inverting said data-modulated signals, means for delaying said data-modulated signals by a predetermined time delay, means for delaying said inverted data-modulated signals by said predetermined time delay, first and second "and" means, means for applying said data-modulated signals and said inverted delayed data-modulated signals to said first "and" means to provide a first series of clock signals and data signals at the output thereof, and means for applying said inverted data-modulated signals and said delayed data-modulated signals to said second "and" means for providing a second series of clock signals and data signals related in time to said first series of signals such that each clock signal in one series is indicative of the clock interval in which a particular data signal of the other series has occurred.

2. The system of claim 1 in which there is provided an "or" gate, and means for applying said inverted delayed data-modulated signals and said delayed data-modulated signals to said "or" gate for producing at the output of said "or" gate a data signal between two successive clock signals to correspond to a demodulated first state bit and to provide an absence of a data signal between two successive clock signals to correspond to a demodulated second state bit.

3. A receiver for binary data-modulated signals of a form having reference potential crossings at the beginning of each clock interval and further reference potential crossings during only certain clock intervals to distinguish binary "one" from binary "zero," including means providing normal and inverted squared forms of the received signal, means providing delayed replicas of such signal forms, means for deriving normal and inverted delayed signal spikes from the rising wave-fronts of each of said delayed signal replicas, a first "and" gate controlled by said normal signal form and the inverted delayed signal spikes and a second "and" gate controlled by said inverted signal form and the normal delayed signal spikes, and an "or" gate connected to said first and second gates to combine the output signals thereof, whereby only data spikes paired with selected preceding clock spikes are emitted by said "or" gate, means operable by said normal and inverted signal spikes for providing a series of clock pulses only, means controlled by said paired data and selected clock spikes to provide data spikes only, and a flip-flop reversely operable by said last two means alternately for providing a train of binary-code signal pulses.

4. A demodulator for rectangular-shaped wave data-modulated signals having clock reference potential crossings at regular intervals and a data reference potential crossing during each of only certain clock intervals and none during other clock intervals to distinguish between binary "one" and binary "zero," including means for deriving a series of pulses from the reference potential crossings of said signal including both clock and data pulses, a first timed gate responsive to a first pulse of the series and closed during most of the ensuing clock interval but open in time to pass the next-following clock pulse, another timed gate responsive to applied pulses of the series and closed during most of each clock interval but open during only an intermediate part of a clock interval to pass data pulses, and a bistable circuit responsive to pulses passed by said timing gates for providing a demodulated data signal.

5. A demodulator in accordance with claim 4, wherein each of said timed gates includes a first monostable circuit responsive to an input pulse, a second monostable circuit responsive to the trailing part of each pulse of the first monostable circuit and "on" during a small part of the clock interval, and an "and" gate opened by the "on" state of the second monostable circuit for passing the next-following input pulse, the "on" times of the first monostable circuits of said first and second timed gates being set to cause said timed gates to pass clock pulses and data pulses, respectively.

6. A receiver for binary data-modulated signals of a form having zero-crossings at the beginning of each clock interval and further zero-crossings during only certain clock intervals to distinguish binary "one" from binary "zero," including means to convert all said zero-crossings to a succession of clock spikes and data spikes delayed by a time shorter than the clock interval but longer than the interval between a clock zero-crossing and the next-following data zero-crossing, gating means controlled by said data-modulated signal to select pairs of spikes each including a data spike and the preceding clock spike, and pulse generating means responsive to said pairs of spikes for providing demodulated binary data in the form of a succession of signals of different levels representing binary "one" and binary "zero," respectively.

7. A data receiver, including means for deriving from an input signal a series of signal spikes including a first signal spike that is followed a certain time later by a second signal spike, a first monostable device triggered "on" by said signal-spike deriving means, said first monostable means having an "on" time that is slightly less than said certain time, a second monostable device triggered "on" by the trailing part of the output of said first monostable device, and an "and" gate having input connections both to said signal spike deriving means and to said second monostable device, the latter being arranged to open the gate for spike transmission for a limited interval starting at a time just before said second spike should occur and continuing until just after said second spike should occur.

8. A receiver for binary data-modulated signals of a form having zero-crossings at the beginning of each clock interval and further zero-crossings during only certain clock intervals to distinguish binary "one" from binary "zero" in the modulated signal, the signal supplied to the receiver being subject to random noise spikes, means for deriving from said signal a spike at each of said zero-crossings so as to include clock spikes and data spikes, and means for segregating those spikes recurring at regular clock intervals, said clock-spike segregating means including gating means and timing means triggered by one of said clock-spikes for opening said gating means a predetermined time after said one spike for a limited time interval, but non-responsive to spikes during the ensuing time equal to a major part of the clock interval, and thereby to suppress any applied spikes occurring outside said limited time interval, said predetermined time being longer than the time between a clock-spike and the next following data spike, and the sum of said predetermined time and said limited time interval being greater than a regular clock interval but less than the sum of a clock interval plus the time between a clock-spike and the next following data spike.

9. A receiver for binary data-modulated signals of a form having reference potential crossings at the beginning of each clock interval and further reference potential crossings during only certain clock intervals to distinguish binary "one" from binary "zero," including means for deriving signal spikes from said data-modulated signal corresponding to each of said reference potential crossings so as to include clock spikes and data spikes and data-spike segregating means includin gating means having a signal-spike input connection and a control connection, and means responsive to each applied clock spike and connected to said control connection to open said gating means a predetermined time after each clock spike for a limited time interval during which the next-following data spike should occur, thereby to transmit data signal spikes and to suppress spikes at the output of said gating means occurring outside said time interval.

10. A receiver for binary data-modulated signals of a form having zero-crossings at the beginning of each clock interval and further zero-crossings during only certain clock intervals to distinguish binary "one" from binary "zero," including means to convert said zero-crossings to a succession of clock spikes and data spikes delayed by a time shorter than the clock interval but longer than the interval between each clock spike and a next-following data spike, means controlled by the data-modulated signal to gate said delayed clock spikes and data spikes so as to transmit only data spikes and selected clock spikes immediately preceding said data clock spikes, and gating means for transmitting only said data spikes including means responsive to said selected clock spikes for opening said data-spike gating means a predetermined time after each said selected clock spike for a limited time interval.

11. A receiver for a binary data-modulated signal of a form having zero-crossings at the beginning of each clock interval and having further zero-crossings during only certain clock intervals to represent binary "one" and binary "zero," said signal commonly being accompanied by noise impulses at the input end of the receiver, said receiver having a noise minimizer including means providing normal and inverted squared forms of said modulated signal, means responsive to the rising front of said normal signal form to provide a blanking signal of short duration compared to the time interval between zero-crossings but long relative to said noise impulses, an "and" gate having joint input from said normal signal supplying means and said blanking means, whereby output signals from said "and" gate have foreshortened output pulses, means responsive to rising fronts of said inverted signal form to provide a fill-in signal having a duration substantially equal to that of said blanking signal, and means to combine the output signals of said "and" gate and of said fill-in signal means and thereby substantially restoring the foreshortened output pulses to their original duration, the blanking means serving to suppress noise spikes between signal pulses and said fill-in means serving to fill-in noise-induced gaps in signal pulses.

12. A receiver in accordance with claim 11 wherein each of said blanking means and said fill-in signal means has an inhibiting control connection to the other so that each is non-responsive to input signals during the short-duration operating time of the other.

13. The method of suppressing noise spikes in a received signal having squared signal pulses of substantial duration, which includes the steps of generating a blanking pulse of short duration but longer than a noise spike in response to each signal-rise and subjecting each squared signal pulse to said blanking pulse to thereby transmit only the remainder of that squared signal pulse, deriving a fill-in pulse of the same polarity of said remainder and of substantially the same duration as said blanking pulse in response to the signal-declines in said received signal, and adding said fill-in pulse to said remainder, thereby to restore said squared signal pulse to its original duration.

14. The method of suppressing drop-out noise spikes in a received signal having squared signal pulses, including the steps of generating a fill-in pulse in response to a sharp declining part of said received signal, said fill-in pulse being of short duration that is nevertheless longer than a drop-out noise spike, and adding said fill-in pulse to the received signal to thereby eliminate drop-out gaps in squared signal pulses of the received signal.

15. An impulse noise minimizer, comprising means to supply a data signal having a succession of significant square-wave pulses of predetermined minimum duration that may be corrupted by much shorter noise pulses between the square-wave pulses and by noise-induced gaps in such square-wave pulses, a first one-shot circuit and means coupling said signal supply means to trigger said first one-shot circuit "on" in response to leading edges of said signal, a second one-shot circuit, means coupling said signal supply means to trigger said second one-shot circuit "on" in response to trailing edges of said data signal, and means for combining said data signal with the output of both said one-shot circuits so that the resulting output is suppressed during the "on" times of said first one-shot circuit and so that the output of the second one-shot circuit during the "on" times thereof is included in the resulting output, thereby to blank noise impulses between square-wave pulses in said signal and to fill noise-induced gaps in said signal.

16. A noise minimizer in accordance with claim 15, wherein said one-shot circuits have mutual inhibiting connections for suppressing response of said first one-shot circuit to leading portions of said signal at the ends of noise-induced gaps within said significant square-wave pulses and for suppressing response of said second one-shot circuit to the trailing portions of noise impulses occurring between said significant square-wave pulses.

17. An impulse noise minimizer, comprising
means providing both normal and inverted square waves wherein the rising fronts of each of the waves coincides with the trailing ends of the other and wherein significant pulses of the square waves are of predetermined minimum duration and may be corrupted by short-time noise spikes and gaps,
a first one-shot circuit connected to the foregoing means and being responsive to the rising fronts of said normal waves to produce output pulses,
a second one-shot circuit connected to said foregoing means and being responsive to the rising fronts of said inverted waves to provide output pulses, the period of said one-shot circuits being substantially equal and substantially longer than said noise spikes and gaps and substantially shorter than the shortest pulses of said square-waves,
an inhibitable gate having an input terminal connected to receive said normal square wave and normally conditioned to pass input of the polarity of said normal square wave, said inhibitable gate being connected to be inhibited by the output of said first one-shot circuit to block the initial portions of the pulses in said normal square wave whereby to block noise pulses between said square-wave pulses and to transmit shortened pulses of said normal square wave, and
a second gate connected to receive and transmit the output of said inhibitable gate and connected to said second one-shot circuit add the output thereof to the trailing edges of said shortened pulses whereby to fill noise-induced gaps in said shortened pulses and to restore the shortened pulses to their initial duration.

18. A receiver for square-wave data-modulated signals having clock zero-crossings at regular intervals and a data zero-crossing during only certain clock intervals but no zero-crossing during other clock intervals, including
a noise-minimizer having one circuit for blanking short portions of the signal in response to rising signal fronts to thereby exclude noise spikes and incidentally to foreshorten signal pulses, said noise minimizer also having a pulse-inserting circuit for adding short pulses to the signal in response to falling signal fronts to thereby fill in noise-induced gaps in signal pulses and to extend the foreshortened signal pulses, and
a demodulator including means for deriving from the resulting signal pulses a series of pulses including both clock pulses and data pulses,
a first timed gate responsive to a first pulse of the series and closed during most of the ensuing clock interval but open in time to pass the next-following clock pulse,
another timed gate responsive to applied pulses of the series and closed during most of each clock interval but open during only an intermediate part of a clock interval to pass data pulses, and
a bistable circuit responsive to pulses passed by said timing gates for providing a demodulated data signal.

19. A demodulator for zero-crossing data-modulated signals having a characteristic clock interval and including one zero-crossing front each clock interval and a further zero-crossing front during only certain clock intervals and not others so as to distinguish binary "one" from "zero," said demodulator including
first and second signal supply channels for providing direct and inverse forms of said signals,
a bistable device,
¾-clock interval delay circuits responsive to the rising fronts of said direct and inverse signal forms and arranged to reverse said bistable device successively and thereby to provide direct and inverse delayed replicas of said data-modulated signals,
first and second "and" gates each having two input control connections, and
an "or" gate combining the output of said "and" gates, the input connections of said first "and" gate being connected for response to said direct signal-form channel and to the rising fronts of said delayed inverse signal replica, the input connections of said second "and" gate being connected for response to said inverse signal-form channel and to the rising fronts of said delayed direct signal replica, whereby said "or" gate provides combined output from said gates consisting of pairs of pulses occurring only during clock intervals having zero-crossings between the clock-interval zero-crossings.

20. A data receiver for utilizing modulated signals of the form having clock zero-crossings at regular intervals and a data crossing in each of only certain of said intervals, including
means responsive to sharp changes in the signal and to blank noise spikes to fill-in noise-induced gaps in the signals,
demodulating means responsive to the sharp changes in the resulting signal cleared of said noise spikes and gaps for providing a series of clock spikes and data spikes,
timed pulse-responsive gating means having a short open time near the end of a clock interval for passing a train of clock spikes,
timed pulse-responsive means having a short open time during each clock interval and responsive to a clock pulse at the beginning of a clock interval for passing the next-following data pulse,
demodulated data-pulse generating means responsive to said time-gated clock and data pulses, and
utilization means including a shift register adapted to receive serial entry of data and responsive to said pulses from said data-pulse generating means and said train of clock pulses.

21. Apparatus for providing a substantially continuous sequence of signals representing progressively varying digital values received after transmission under conditions that tend to introduce errors, including
a data receiving circuit having temporary data storage means, spare data storage means, data utilization means, and
means controlled by said data receiving circuit in dependence upon whether an error is or is not present, to transfer stored data-representing signals from said spare data storage means to said utilization means or, selectively, to transfer stored data-representing signals from said temporary data storage means both to said utilization means and to said spare storage means.

22. A data receiver having data signal utilization means,
first data storing means, data signal supply means coupled to said first data storing means,
spare data storing means,
transfer means for entering data from said first data storing means to said spare data storing means, and
selectively operable means for coupling said spare data storing means to said utilization means, or for coupling said first data storage means to said utilization means and for rendering said transfer means effective.

References Cited

UNITED STATES PATENTS 3,011,053 11/1961 Sev ______________ 328—165 X

JOHN W. CALDWELL, *Acting Primary Examiner.*

DAVID G. REDINBAUGH, *Examiner.*

J. T. STRATMAN, *Assistant Examiner.*